UNITED STATES PATENT OFFICE.

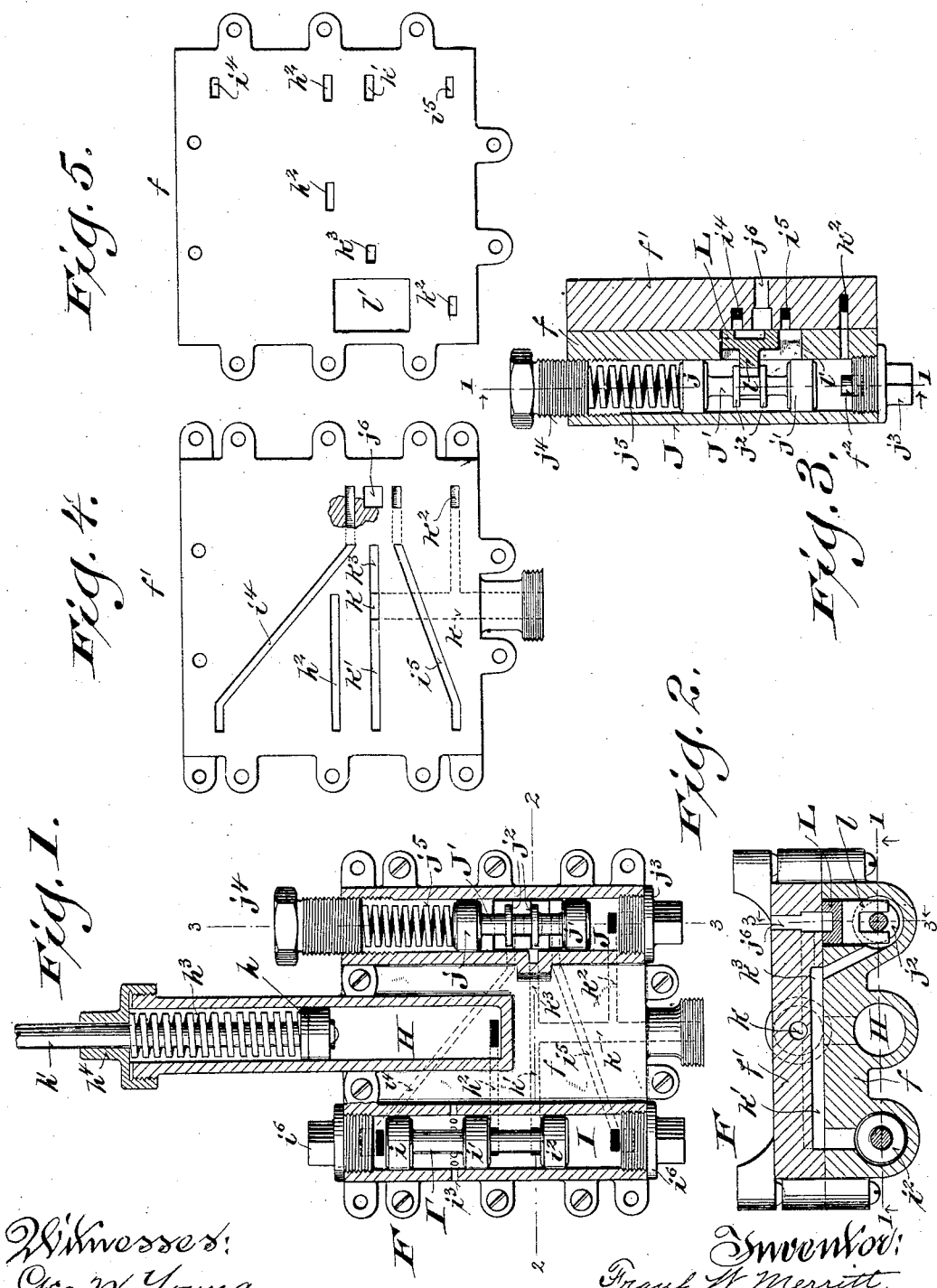

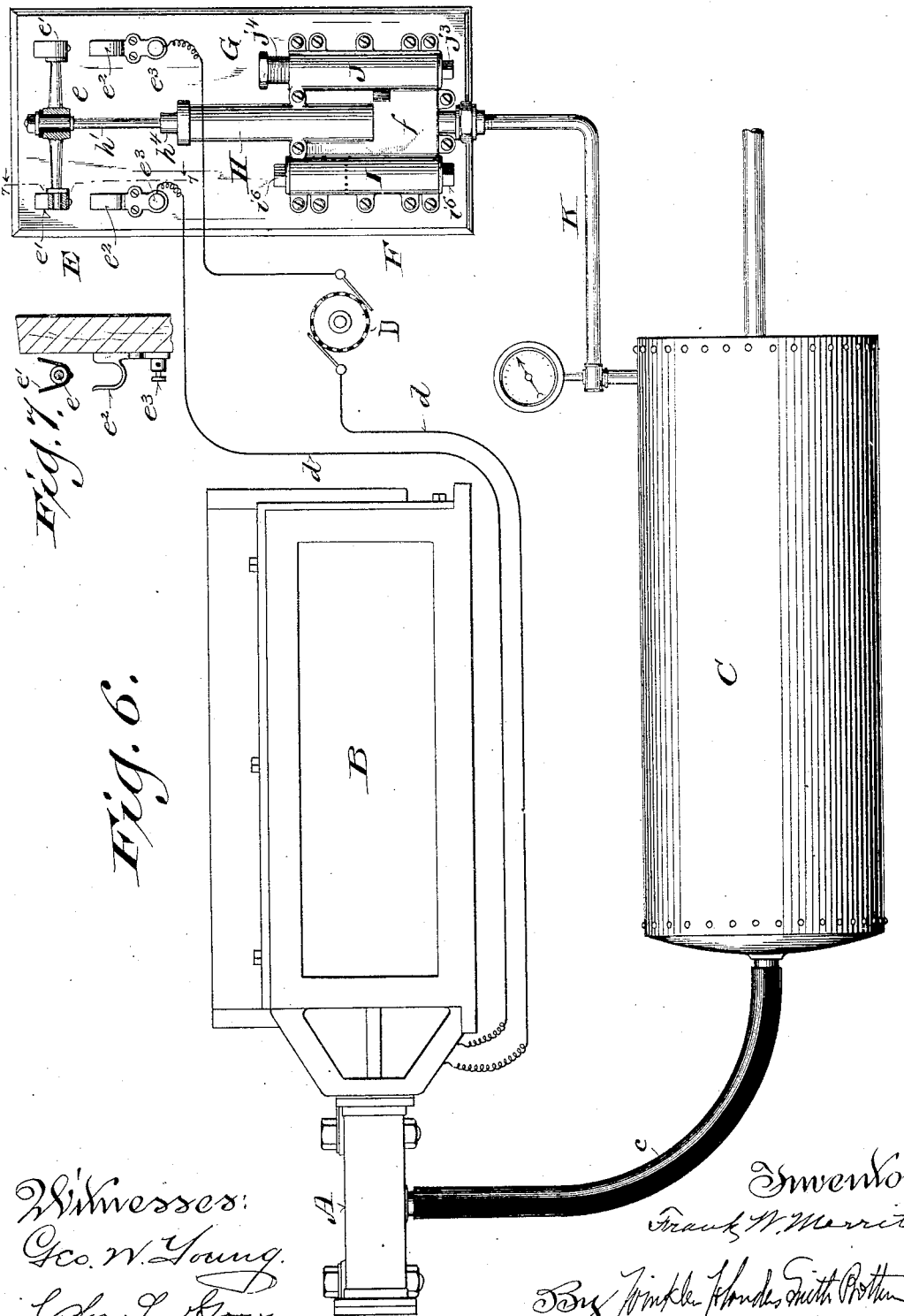

FRANK W. MERRITT, OF DULUTH, MINNESOTA, ASSIGNOR TO THE ELECTRIC MOTOR COMPANY, OF SAME PLACE.

CONTROLLER FOR ELECTRIC PUMPS.

SPECIFICATION forming part of Letters Patent No. 571,600, dated November 17, 1896.

Application filed February 14, 1896. Serial No. 579,259. (No model.)

*To all whom it may concern:*

Be it known that I, FRANK W. MERRITT, of Duluth, in the county of St. Louis and State of Minnesota, have invented certain new and useful Improvements in Controllers for Electric Pumps; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to maintain the pressure at a certain point or between given limits by breaking the electric circuit of the pump-motor when the pressure rises to a certain limit and closing said circuit when the pressure falls to a certain limit, and to positively and quickly shift the switch which controls said circuit.

It consists of certain novel features in the construction and arrangement of component parts of the apparatus, as hereinafter particularly described, and pointed out in the claims.

In the accompanying drawings like letters designate the same parts in the several figures.

Figure 1 is a longitudinal section on the line 1 1, Figs. 2 and 3, of the switch actuating, controlling, and regulating cylinders and pistons. Fig. 2 is a cross-section of the same on the line 2 2, Fig. 1. Fig. 3 is a longitudinal section of the controlling-cylinder on the line 3 3, Fig. 1. Figs. 4 and 5 are face views of the back and front plates, respectively, of the cylinder and valve-case. Fig. 6 is an elevation of my improved controller shown in connection with an electric pump and generator; and Fig. 7 is a section on the line 7 7, Fig. 6, of a part of the switch.

Referring to Fig. 6, A designates a pump or compressor; B, an electric motor connected with and arranged to actuate said pump; C, a fluid-pressure tank or reservoir connected by a pipe or hose $c$ with the force side of the pump, and D a dynamo connected by wires or conductors $d\ d$ with the pump-motor B.

My improved controller comprises a switch E, arranged to break and close the pump-motor circuit $d\ d$, as hereinafter explained, and of a fluid-pressure actuating and controlling device F, which may conveniently be mounted upon the same base G with the switch. The switch E is preferably made of the double-break single-pole type (but may be either single or double pole) and consists of a cross-head $e$, provided at the ends with U-shaped spring-strips $e'\ e'$, made of thin plates of copper or other suitable elastic electrical conductor, and of correspondingly-shaped seats $e^2\ e^2$ of conducting material, to which the wires or conductors $d\ d$ of the motor-circuit are attached by binding-posts $e^3\ e^3$ or by other suitable means. The spring-strips $e'\ e'$, which are preferably laminated or composed each of a number of thin plates, are spread at their ends, as shown in Fig. 7, so as to insure good electrical contacts when they are forced into the seats $e^2$.

The fluid-pressure actuating and controlling device F consists of cylinders H, I, and J, which may be conveniently formed in the front plate $f$ of the casing. The cylinder H is provided with a piston $h$, which is connected by its rod $h'$ with the cross-head $e$ of the switch. It communicates at one end, through ports and a connecting-passage $h^2$ in the back plate $f'$ of the case, with the cylinder I at an intermediate point therein, as shown in Figs. 1 and 4. A spiral spring $h^3$, surrounding the piston-rod $h'$, bears at one end against the piston $h$ and at the opposite end against a perforated cap or gland $h^4$, through which said rod passes and which is attached to and closes the end of cylinder H opposite passage $h^2$.

The cylinder I is provided with a piston I', having three heads $i,\ i'$, and $i^2$, and it is formed between the heads $i\ i'$ with lateral exhaust-apertures $i^3$. It is connected at or near the ends, through ports and passages $i^4$ and $i^5$, formed in the back plate $f'$, as shown in Fig. 4, with cylinder J at an intermediate point therein. The ends of the cylinder I are closed by screw-caps or plugs $i^6\ i^6$.

The cylinder J is provided with a piston J', having two heads $j\ j'$ and intermediate shoulders $j^2$, formed on the stem connecting said heads. The ends of said cylinder J are closed by screw-caps or plugs $j^3$ and $j^4$, the latter being adjustable, and between the adjustable plug $j^4$ and the piston-head $j$ is interposed a spring $j^5$.

A pipe K connects a passage $k$, formed in the back plate $f'$, with the compressed-air reservoir C, and said passage $k$ communicates through a branch $k'$ with cylinder I, between the heads $i'$ and $i^2$ of its piston, through a branch $k^2$ with the end of cylinder J opposite the spring $j^5$, and through a branch $k^3$ with said cylinder J, between its piston-heads $j$ and $j'$. The exhaust port or opening $j^6$ is formed in the back plate $f'$ midway between the ports or passages $i^4$ and $i^5$, opening into cylinder J, as shown in Figs. 2, 3, and 4.

L is a slide-valve of the D type, the forked stem $l$ of which embraces the stem of piston J' between its shoulders $j^2$. It is inserted in an opening $l'$, formed therefor in the front plate $f$, and controls the ports in the back plate $f$, communicating with said opening. The movement of the piston I' in both directions and of the piston J' in one direction away from the spring $j^5$ is limited by stops, such as $f^2$. (Shown in Fig. 3.) These stops may be made of soft rubber inserted in sockets in the plugs $i^6$ and $j^3$. They are removed in Fig. 1, so as not to obscure the ports which are located opposite them in cylinders I and J.

My improved controller operates as follows: Assuming that the pressure in reservoir C is at the maximum limit which the apparatus is adjusted to maintain and that the switch and pistons are in the positions shown in Figs. 1, 3, and 6, the motor-circuit being broken the switch E is held open, as long as the pressure is maintained, by its action on the lower end of piston $h$ in opposition to spring $h^3$, the lower end of cylinder H being in communication with the fluid-pressure reservoir C through passage $h^2$, cylinder I, between its piston-heads $i'$ and $i^2$, passages $k'$ and $k$, and pipe K. If now the pressure falls, the spring $j^5$ will move the piston J' against the reduced pressure in the opposite end of cylinder J and shift the valve L, so as to establish communication between the passage $i^5$ and exhaust-port $j^6$ and open communication between the passage $i^4$ and the fluid-pressure pipe K through passages $k^3$ and $k$. Compressed air will now pass from reservoir C, through pipe K, passages $k$ $k^3$, valve-chamber $l'$, passage $i^4$, into the upper end of cylinder I above the piston-head $i$. At the same time the air in the lower end of said cylinder below the piston-head $i^2$ is free to escape through passage $i^5$, valve-chamber $l'$, and exhaust-port $j^6$. Piston I' will thus be instantly shifted so as to carry its head $i'$ between the passages $h^2$ and $k'$, thereby cutting off communication between cylinder H and the fluid-pressure reservoir and opening said cylinder to exhaust through the passage $h^2$ and the apertures $i^3$. The lower end of piston $h$, being thus relieved of pressure, will be instantly forced by spring $h^3$ toward port $h^2$ and will carry the spring-strips $e'$ of switch E into engagement with the seats $e^2$, thereby closing the circuit $d$ $d$ and starting the motor and pump. As soon as the pressure in reservoir C is raised to normal by the action of the pump the piston J' will be forced by such pressure against the tension of spring $j^5$ into its original position, as shown in Figs. 1 and 3, so as to establish communication between passage $i^4$ and exhaust-port $j^6$, and between passage $i^5$ and passage $k^3$, through valve-chamber $l'$. In this position of the piston J' and valve L fluid-pressure will be admitted to the lower end of cylinder I and released from the upper end of said cylinder, and its piston I' will be instantly shifted into its original position, as shown in Fig. 1, establishing communication between the lower end of cylinder H and the fluid-pressure pipe K. The piston $h$ will now be forced upwardly against the tension of spring $h^3$ and will instantly carry the spring-strips $e'$ of the switch out of contact with their seats $e^2$, thereby breaking the motor-circuit and stopping the pump. The degree of pressure at which the controller will open or close the circuit can be regulated by means of the screw-plug $j^4$, which serves to compress the spring $j^5$.

For convenience in explanation the cylinder H and piston $h$ may be designated the "switch-actuating" cylinder and piston; the cylinder J and piston J', the "controlling" cylinder and piston, and the cylinder I and and its piston I' the "intermediate" cylinder and piston.

By means of the several cylinders and pistons, as herein shown and described, I am enabled to positively and instantly shift the switch and close or break the circuit whenever a slight variation in pressure occurs. This is of great importance in connection with powerful currents for the reason that a slow or uncertain operation of the switch is liable to produce an arc between the contacts of the switch and thus burn the switch out and otherwise injure the apparatus.

I do not wish to be understood as limiting myself to the exact details of construction shown and described, and by the terms "cylinder" and "piston," as herein employed, I intend to include the obvious equivalents thereof, such as expansion-chambers and diaphragms.

I claim—

1. In a controller for electric pumps, the combination with a switch governing the electric circuit of the pump-motor, of a switch-actuating piston and cylinder, a controlling piston and cylinder connected at one end with the force side of the pump, a spring acting on said piston in opposition to the pump-pressure, and an intermediate cylinder and piston controlling fluid-pressure supply and waste of the switch-cylinder and piston and in turn governed in operation by said controlling-piston, substantially as and for the purposes set forth.

2. In a controller for electric pumps, the combination with a switch governing the electric circuit of the pump-motor, of a switch-actuating piston and cylinder having a fluid-pressure supply and exhaust connection at one end and a spring acting on said piston in opposition to the fluid-pressure, a controlling piston and cylinder connected at one end with the force side of the pump, and having a spring acting on said piston in opposition to the pump-pressure, and an intermediate cylinder and piston controlling the supply and exhaust connection of the switch-cylinder and in turn controlled in its operation by said controlling-piston, substantially as and for the purposes set forth.

3. In a controller for electric pumps, the combination with a switch controlling the electric circuit of the pump-motor, of a switch-actuating cylinder and piston having a fluid-pressure supply and waste connection, a controlling piston and cylinder connected with the force side of the pump, an adjustable spring acting upon said piston in opposition to the pump-pressure, and an intermediate cylinder and piston controlling the supply and waste connection of the switch-cylinder, and in turn controlled in operation by said controlling-piston, substantially as and for the purposes set forth.

4. In a controller for electric pumps, the combination with a switch governing the electric circuit of the pump-motor, of a switch-actuating piston and cylinder having a fluid-pressure supply and exhaust connection, a controlling piston and cylinder having a constant connection with the force side of the pump and a spring acting upon said piston against the pump-pressure, and an intermediate piston and cylinder controlling the supply and exhaust connection of the switch-cylinder, and having a supply and exhaust connection governed by said controlling-piston, the several cylinders having connections with the force side of the pump, substantially as and for the purposes set forth.

5. In a controller for electric pumps, the combination with an electric switch, of a switch-actuating piston having a fluid-pressure supply and exhaust connection, a spring acting on said piston against the fluid-pressure, a controlling piston and cylinder having a constant connection with the force side of the pump, and a spring acting upon said piston against the pump-pressure, an intermediate piston and cylinder controlling the supply and exhaust connection of the switch-cylinder, and having fluid-pressure supply and exhaust connections, and a valve connected with the controlling-piston and governing the supply and exhaust connections of the intermediate cylinder, substantially as and for the purposes set forth.

In testimony that I claim the foregoing as my own I affix my signature in presence of two witnesses.

FRANK W. MERRITT.

Witnesses:
D. H. BATES, Jr.,
CHARLES F. BOSTWICK.